United States Patent
Hayashi

[19]

[11] Patent Number: 6,149,270

[45] Date of Patent: Nov. 21, 2000

[54] OPTICAL LENSES FOR CORRECTING COLOR VISION

[76] Inventor: Masashi Hayashi, 48-3 Kamata-cho, Matsuzaka-shi, Mie-ken, Japan

[21] Appl. No.: 09/476,115

[22] Filed: Jan. 3, 2000

[30] Foreign Application Priority Data

Oct. 18, 1999 [JP] Japan .................................. 11-295514

[51] Int. Cl.$^7$ ...................................................... G02C 7/10
[52] U.S. Cl. .............................................................. 351/163
[58] Field of Search ..................................... 351/221, 246, 351/163, 162, 177, 159, 213, 165

[56] References Cited

U.S. PATENT DOCUMENTS 5,369,453 11/1994 Chen et al. .
5,774,202 6/1998 Abraham et al. .
5,801,808 9/1998 Abraham et al. ........................ 351/221

FOREIGN PATENT DOCUMENTS 9-503402 4/1997 Japan .
11-225960 8/1999 Japan .
11-311756 11/1999 Japan .
95/05621 2/1995 WIPO .

*Primary Examiner*—George Manuel
*Attorney, Agent, or Firm*—McDermott, Will & Emery

[57] ABSTRACT

There is provided an optical lens for correcting color vision for always and adequately correcting and normalizing anomalous color vision. Wavelength where a spectral sensitivity curve of anomalous color among the three primary colors of a person having anomalous color vision marks its maximum value is corrected so as to enlarge the difference from wavelength where a spectral sensitivity curve of color adjoining thereto marks its maximum valueby setting the transmittance around the wavelength where the spectral sensitivity curve of the color adjoining to the spectral sensitivity curve of the anomalous color marks its maximum value below 50% and by setting the transmittance around the wavelength where the spectral sensitivity curve of the anomalous color marks its maximum value as high as possible.

4 Claims, 13 Drawing Sheets

OPTICAL LENSES FOR CORRECTING COLOR VISION

BACKGROUND OF THE INVENTION

1. Field of the Invention

The present invention relates to optical lenses for correcting anomalous color vision such as color blindness and color weakness.

2. Description of the Related Art

According to an invention disclosed in Japanese Patent No. 2813743, color blindness and color weakness correcting glasses of four kinds and 32 classes which have been capable of correcting color blindness and color weakness for a large number of cases have come to be developed by implementing correcting tests on a large number of subjects of color blindness and color weakness and by obtaining four types of color blindness and color weakness correcting spectral curves of A through D groups.

Japanese Patent Publication No. 9-503402 has also proposed a method of measuring red, green and blue spectral sensitivity curves of persons having anomalous color vision to improve the color vision by means of color filters compensating the difference from the normal spectral sensitivity curve.

However, there have been many cases in which the anomalousness of each individual is not fully improved by the lenses selected or manufactured under these methods. For instance, they allowed those persons to sense the colors from green to red such as green, yellow green, yellow, orange and red by only one color sense as green=yellow=red. Accordingly, when the brightness is the same, those persons are unable to distinguish the colors. Therefore, the further improvement of those lenses has been desired. That is, because only the person in question can sense the color blindness and weakness and has not experienced the normal color vision because they are congenital, the degree of improvement of color vision by means of the conventional color filters have been insufficient in many cases.

Then, it is an object of the invention to develop a more appropriate optical lens for correcting color vision under a new theory and to facilitate the production or selection of lenses truly suitable for each individual subject.

SUMMARY OF THE INVENTION

In order to achieve the above-mentioned object, an inventive optical lens for correcting color vision is arranged such that wavelength where a spectral sensitivity curve of anomalous color among the three primary colors of a person having anomalous color vision marks its maximum value is corrected so as to enlarge the difference from wavelength where a spectral sensitivity curve of color adjoining thereto marks its maximum value by setting the transmittance around the wavelength where the spectral sensitivity curve of the color adjoining to the spectral sensitivity curve of the anomalous color marks its maximum value below 50% and by setting the transmittance around the wavelength where the spectral sensitivity curve of the anomalous color marks its maximum value as high as possible.

An inventive optical lens for correcting color vision is also arranged such that wavelength where a spectral sensitivity curve of red of a person having anomalous red color vision marks its maximum value is corrected to the longer wavelength side to enlarge the difference from wavelength where a spectral sensitivity curve of green marks its maximum value by setting the transmittance around the wavelength where the spectral sensitivity curve of green marks its maximum value below 50% and by setting the transmittance around the wavelength where the spectral sensitivity curve of red marks its maximum value as high as possible.

An inventive optical lens for correcting color vision is arranged further such that wavelength where a spectral sensitivity curve of green of a person having anomalous green color vision marks its maximum value is corrected to the shorter wavelength side to enlarge the difference from wavelength where a spectral sensitivity curve of red marks its maximum value by setting the transmittance around the wavelength where the spectral sensitivity curve of red marks its maximum value below 50% and by setting the transmittance around the wavelength where the spectral sensitivity curve of green marks its maximum value as high as possible.

An inventive optical lens for correcting color vision is still arranged such that wavelength where a spectral sensitivity curve of blue of a person having anomalous blue color vision marks its maximum value is corrected to the shorter wavelength side to enlarge the difference from wavelength where a spectral sensitivity curve of green marks its maximum value by setting the transmittance around the wavelength where the spectral sensitivity curve of green marks its maximum value below 50% and by setting the transmittance around the wavelength where the spectral sensitivity curve of blue marks its maximum value as high as possible.

The above and other advantages of the invention will become more apparent in the following description and the accompanying drawings.

DESCRIPTION OF THE REFERENCE NUMERALS AND SIGNS

R corrected new red spectral sensitivity curve
G corrected new green spectral sensitivity curve
B corrected new blue spectral sensitivity curve

DESCRIPTION OF THE PREFERRED EMBODIMENT

Figure 1:
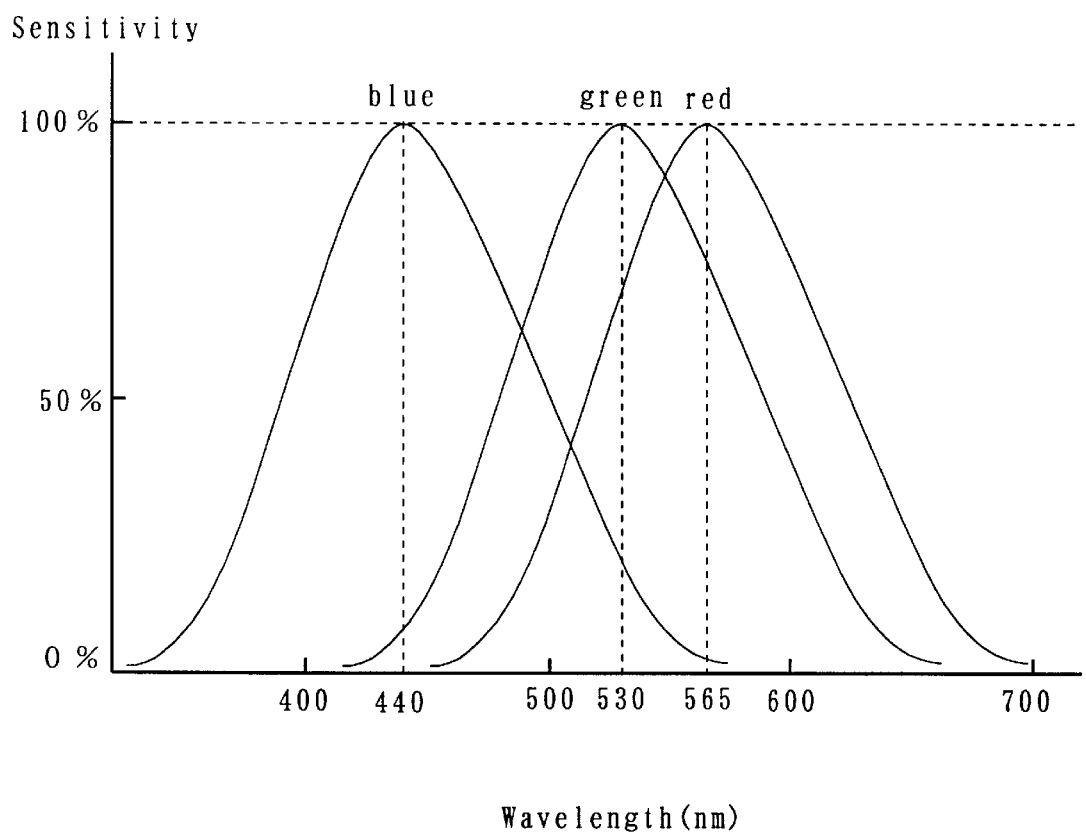
FIG. 1 is a graph showing red, green and blue spectral sensitivity curves of a person having normal color vision.

An embodiment of the present invention will be explained below with reference to the drawings. FIG. 1 is a graph showing spectral sensitivity curves of eyes of a person having normal color vision, representing wavelength (nm) by the horizontal axis and the sensitivity to each wavelength by the vertical axis in percentage (%). In case of the normal person, the red spectral sensitivity curve marks its maximum value at 565 (± measuring error and individual difference) nm, the green spectral sensitivity curve marks its maximum value at 530 (± measuring error and individual difference) nm and the blue spectral sensitivity curve marks its maximum value at 440 (± measuring error and individual difference) nm.

Figure 2:
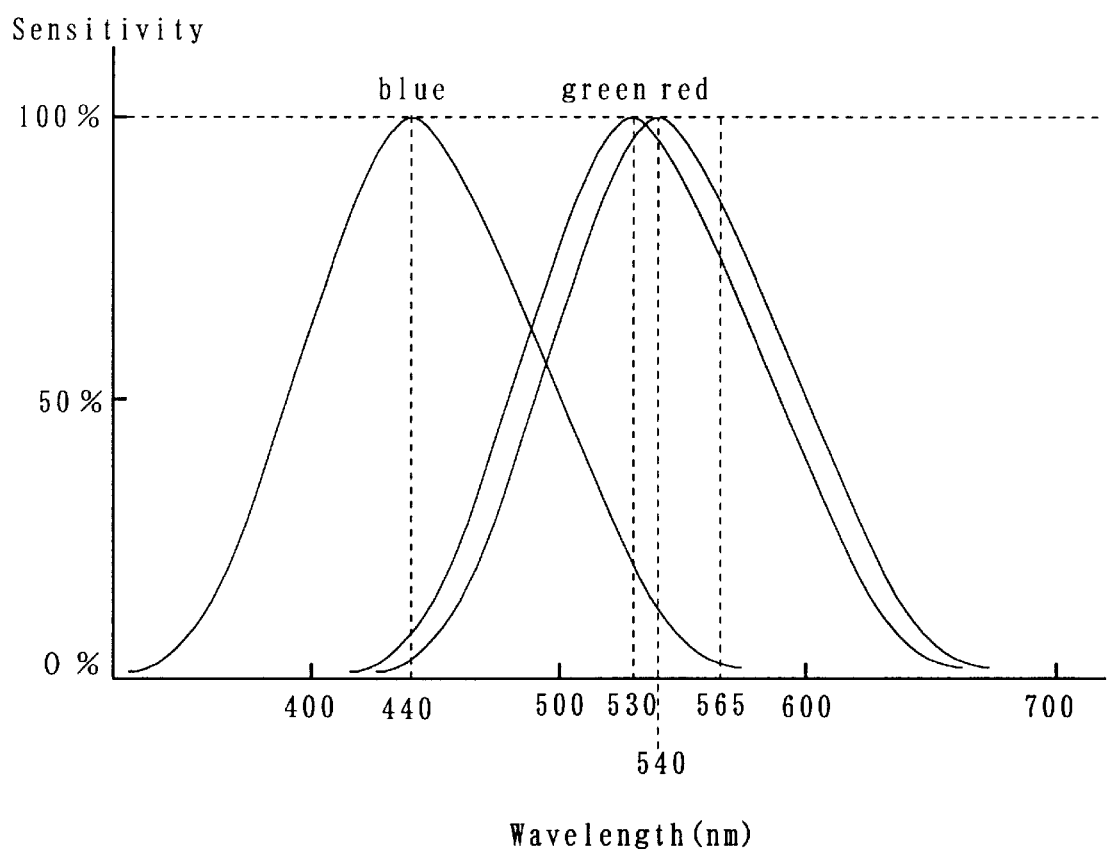
FIG. 2 is a graph showing spectral sensitivity curves of a person having anomalous red color vision.

Meanwhile, FIG. 2 is a graph of spectral sensitivity curves of a person whose color sense to blue is normal and to red is anomalous. In case of this person having the red anomalous color vision, the wavelength where the red spectral sensitivity curve marks its maximum value is 540 nm and is very close to the green spectral sensitivity curve as shown in the graph, so that this person is assumed to have a symptom of hardly discerning red within green. That is, because the difference between the wavelength where the green spectral sensitivity curve marks its maximum value and the wavelength where the red spectral sensitivity curve marks its maximum value is so small as 10 nm, the person is assumed to have only color senses which are the same or very close for colors from green to red.

Figure 3:
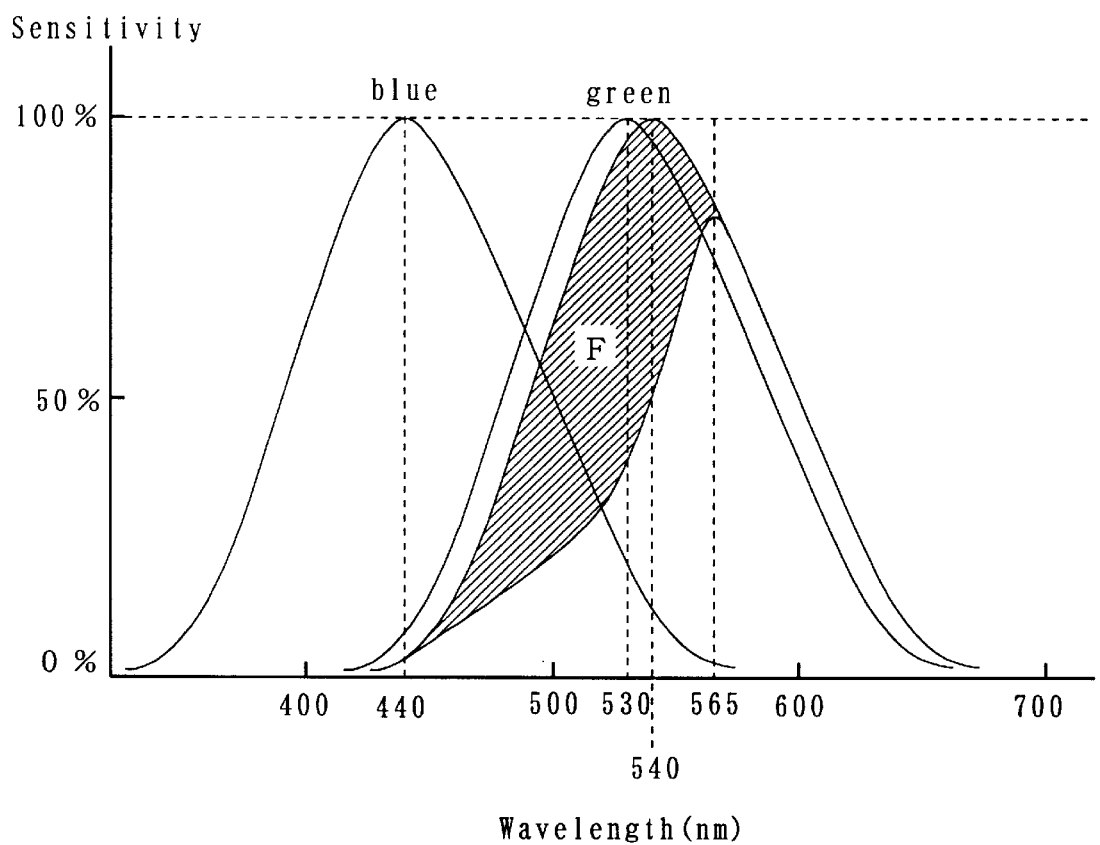
FIG. 3 is a graph showing the state in correcting the red spectral sensitivity curve of the person having anomalous red color vision according to the invention.
Figure 4:
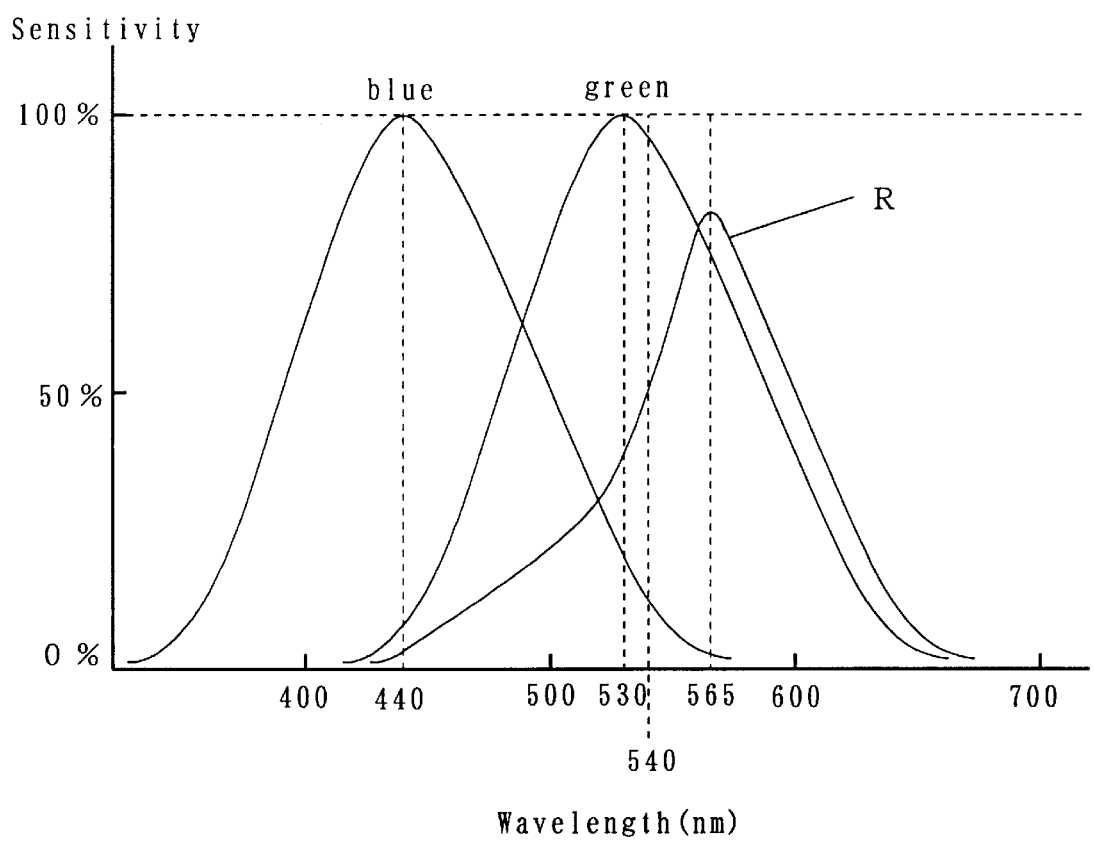
FIG. 4 is a graph showing a correcting spectral sensitivity curve of the person having anomalous red color vision according to the invention.

Then, according to the invention, a hatched part of the anomalous red spectral sensitivity curve as indicated by F in FIG. 3 is cut through an anomalous red color vision correcting lens to be able to obtain a new red spectral sensitivity curve R as shown in FIG. 4. The wavelength where the red spectral sensitivity curve of the person having the anomalous red color vision marks its maximum value is corrected to the longer wavelength side so that the difference from the wavelength where the green spectral sensitivity curve marks its maximum value is enlarged by setting the transmittance around the wavelength (i.e., 530 nm) where the green spectral sensitivity curve marks its maximum value below 50% as shown in a graph of a curve of wavelength vs. transmittance in FIG. 5 and by setting the transmittance around the wavelength (i.e., 565 nm) wherein the red spectral sensitivity curve marks its maximum value as high as possible. It is noted that in FIG. 4, the wavelength where the new red spectral sensitivity curve R marks its maximum value is corrected to 565 nm and the difference from the wavelength where the green spectral sensitivity curve marks its maximum value is enlarged to 35 nm. As a result, the color vision of that person was improved considerably as the colors such as green, yellow green, yellow, orange and red have become apparent.

Figure 6:
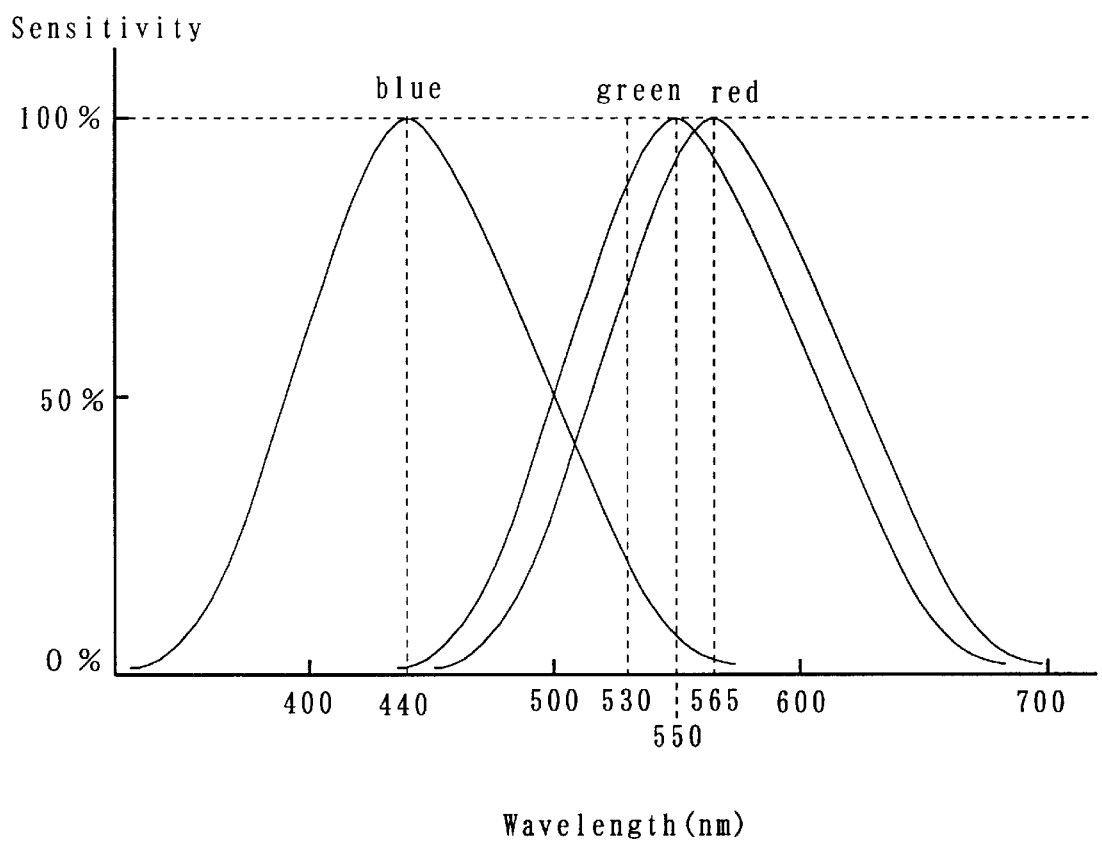
FIG. 6 is a graph showing spectral sensitivity curves of a person having anomalous green color vision.

FIG. 6 is a graph of spectral sensitivity curves of a person having anomalous green color vision with a reason that the wavelength of the green spectral sensitivity curve is shifted largely to the longer wavelength side and is close to that of the red spectral sensitivity curve. This person having the anomalous green color vision is assumed to be unable to discern colors around yellow because the wavelength where the green spectral sensitivity curve marks its maximum value is 550 nm as shown in the graph.

Figure 7:
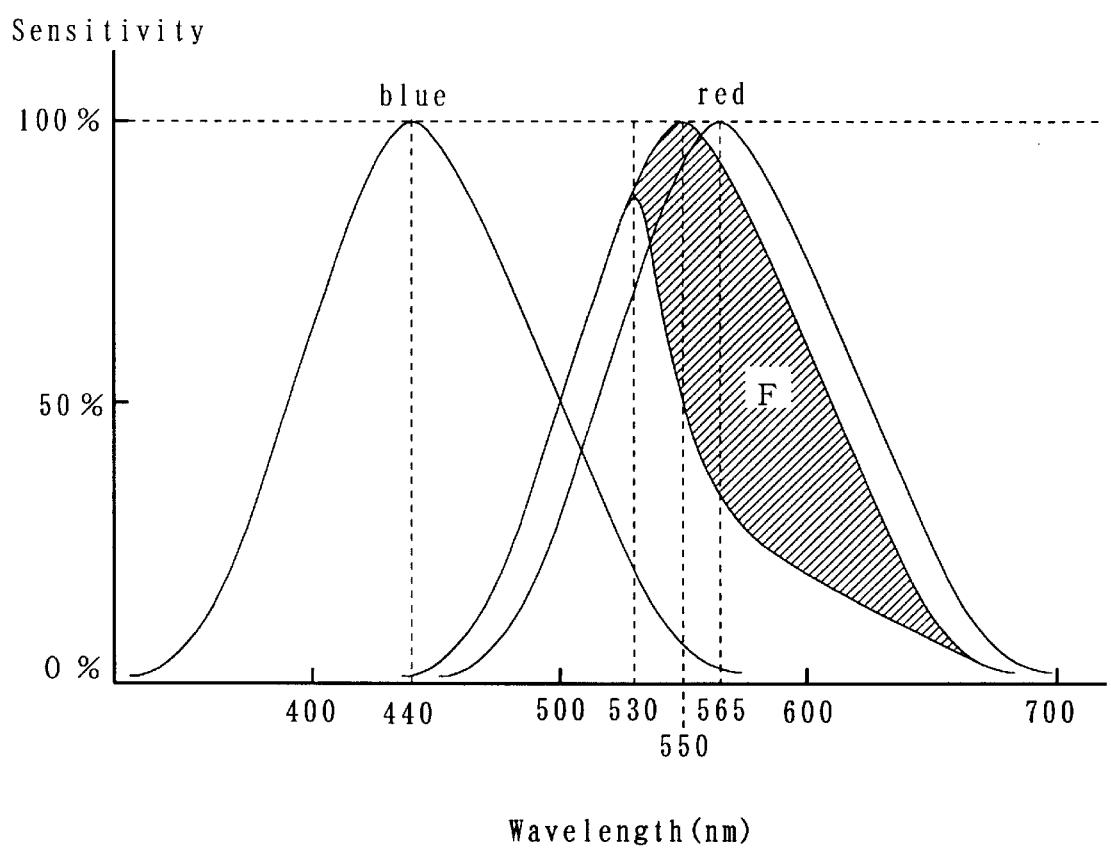
FIG. 7 is a graph showing the state in correcting the green spectral sensitivity curve of the person having anomalous green color vision according to the invention.
Figure 8:
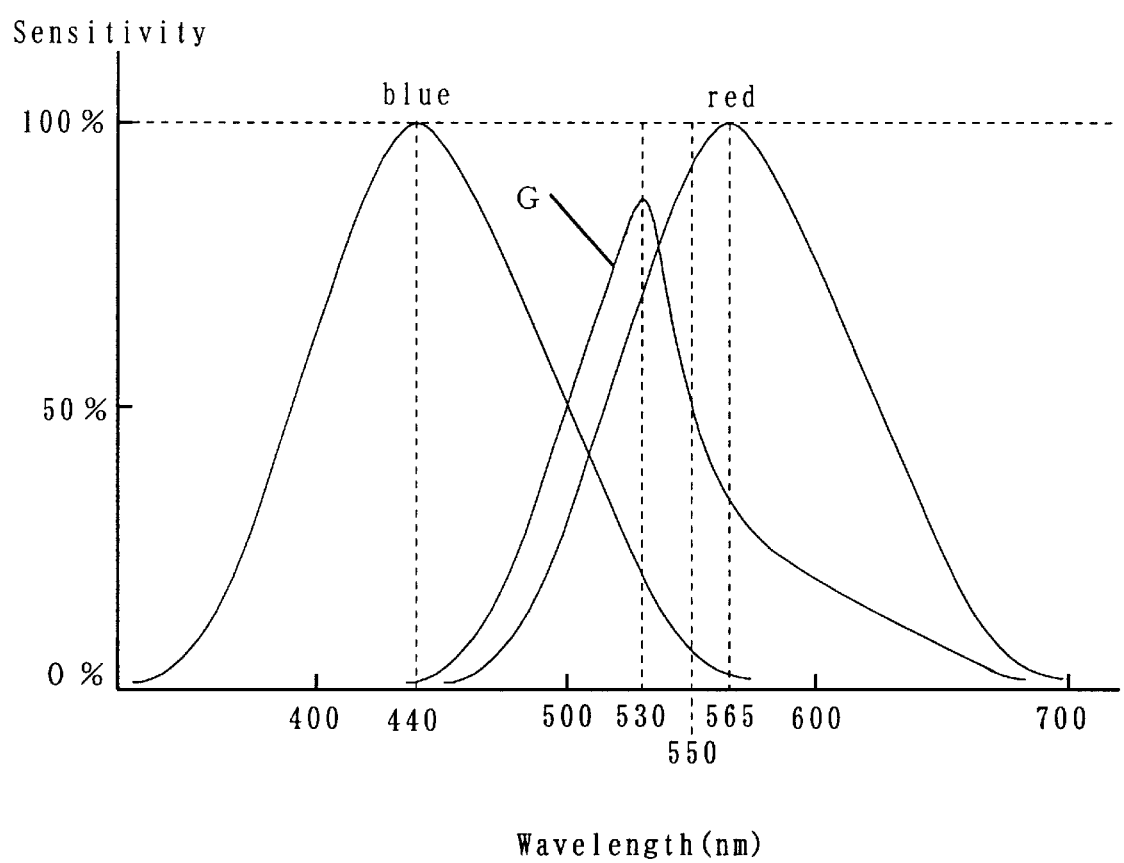
FIG. 8 is a graph showing a correcting spectral sensitivity curve of the person having anomalous green color vision according to the invention.

Then, according to the invention, a hatched part of the anomalous green spectral sensitivity curve as indicated by F in FIG. 7 is cut through an anomalous green color vision correcting lens to be able to obtain a new green spectral sensitivity curve G as shown in FIG. 8. The wavelength where the green spectral sensitivity curve of the person having the anomalous green color vision marks its maximum value is corrected to the shorter wavelength side so that the difference from the wavelength where the red spectral sensitivity curve marks its maximum value is enlarged by setting the transmittance around the wavelength (i.e., 565 nm) where the red spectral sensitivity curve marks its maximum value below 50% as shown in a graph of a curve of wavelength vs. transmittance in FIG. 9 and by setting the transmittance around the wavelength (i.e., 530 nm) wherein the green spectral sensitivity curve marks its maximum value as high as possible. It is noted that in FIG. 8, the wavelength where the new green spectral sensitivity curve G marks its maximum value is corrected to 530 nm and the difference from the wavelength where the red spectral sensitivity curve marks its maximum value is enlarged to 35 nm. As a result, the color vision of that person was improved considerably as the colors such as green, yellow green, yellow, orange and red have become apparent.

Figure 10:
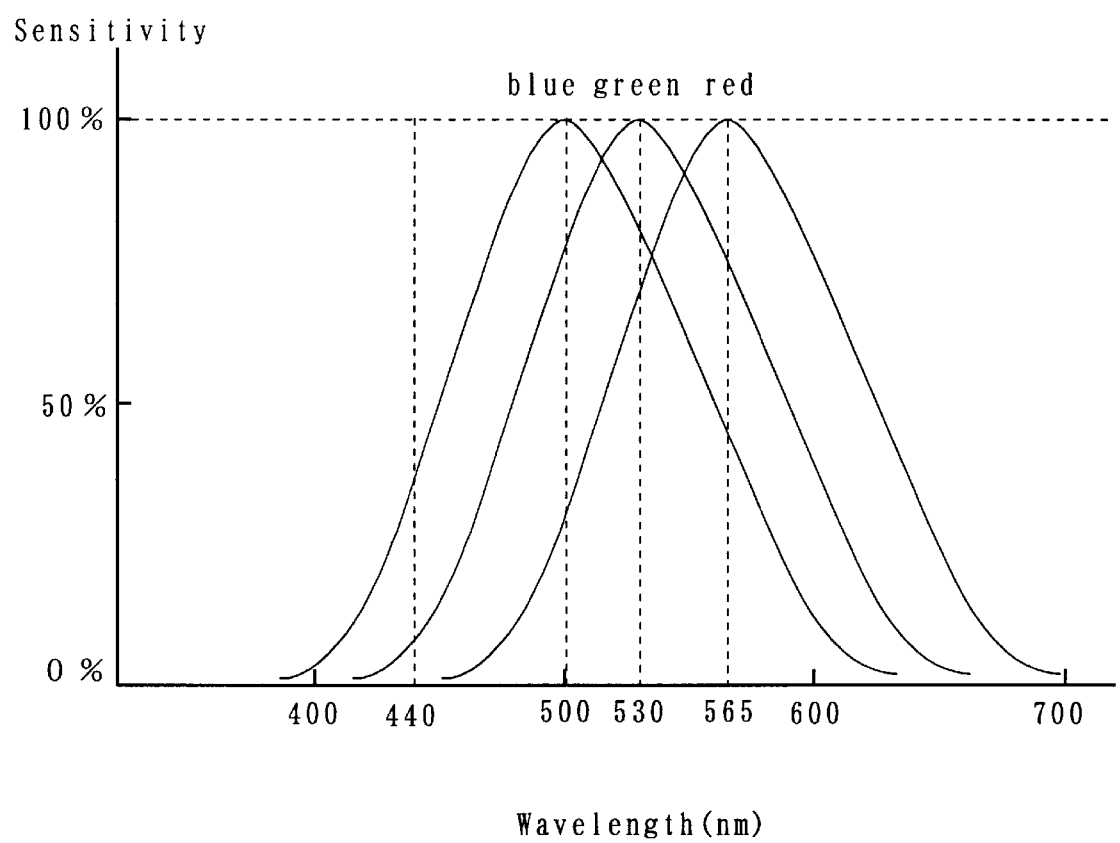
FIG. 10 is a graph showing spectral sensitivity curves of a person having anomalous blue color vision.

FIG. 10 is a graph of spectral sensitivity curves of a person having anomalous blue color vision with a reason that the wavelength of the blue spectral sensitivity curve is shifted to the longer wavelength side, though this case is very rare. This person is assumed to be unable to discern blue because the wavelength where the blue spectral sensitivity curve marks the maximum value is 500 nm as shown in the graph.

Figure 11:
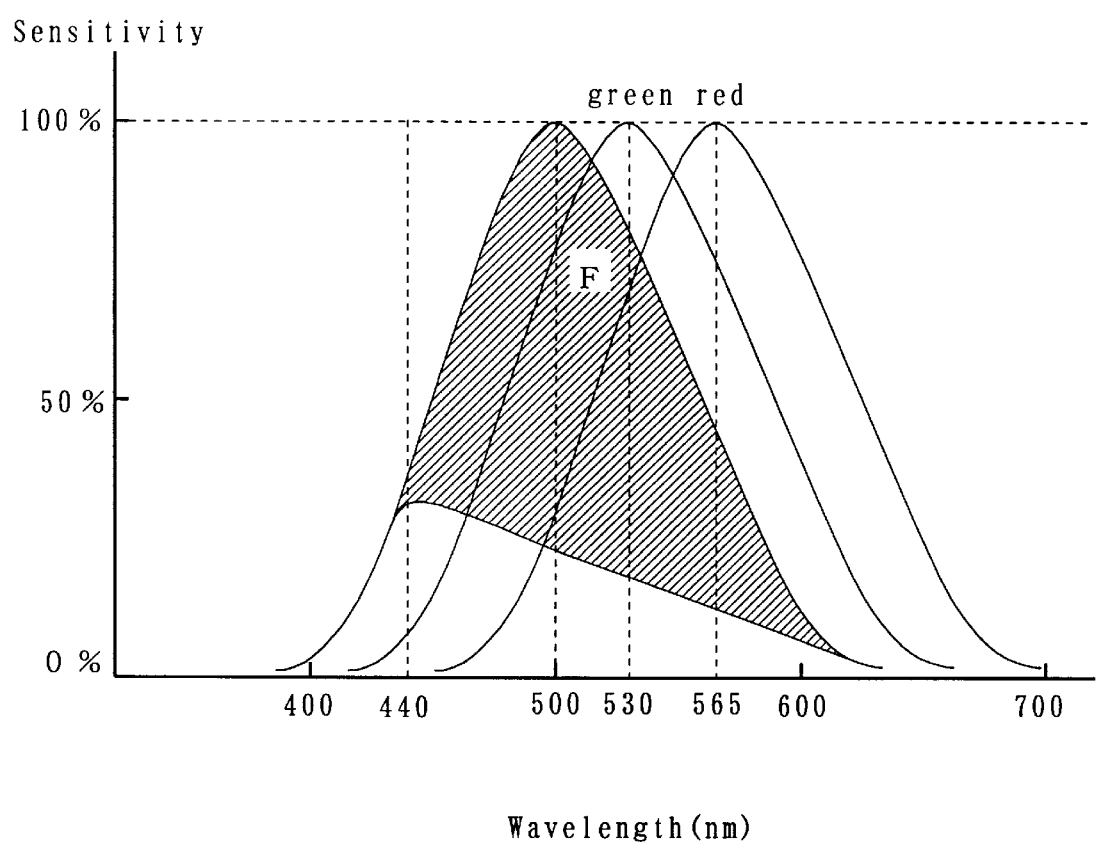
FIG. 11 is a graph showing the state in correcting the blue spectral sensitivity curve of the person having anomalous blue color vision according to the invention.
Figure 12:
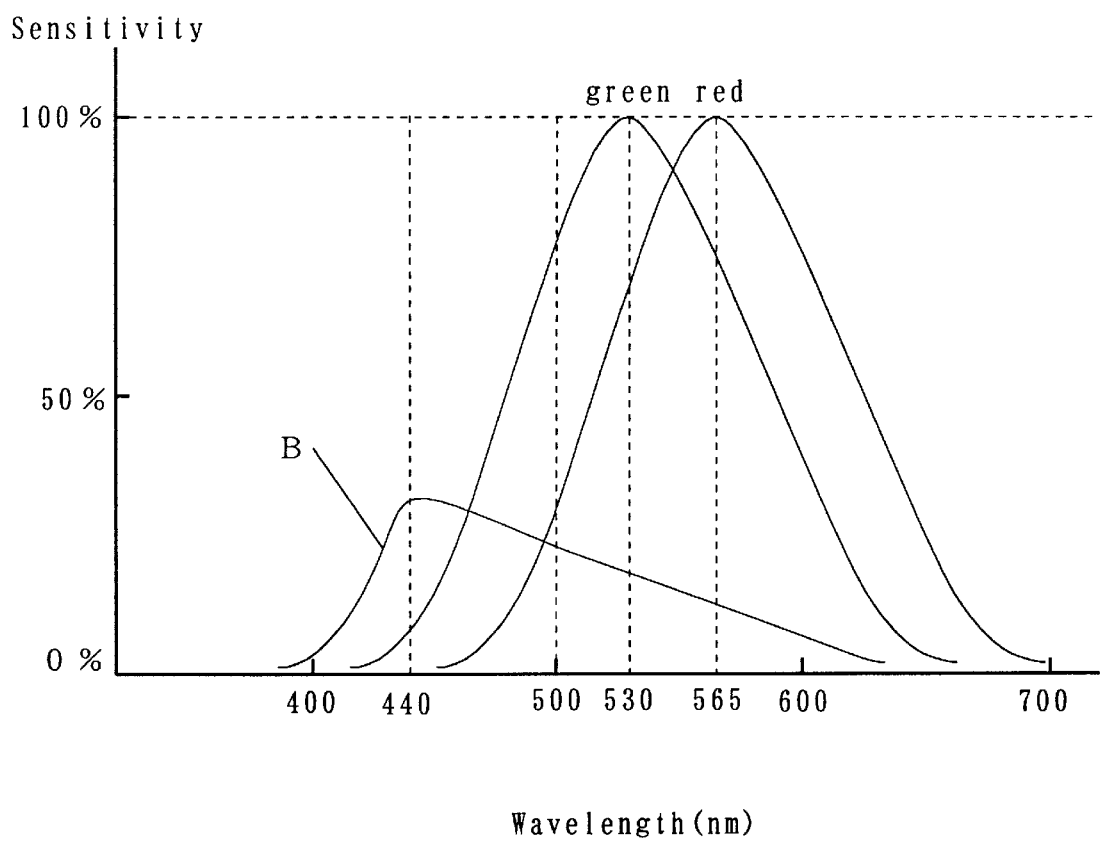
FIG. 12 is a graph showing a correcting spectral sensitivity curve of the person having anomalous blue color vision according to the invention.

In this case, a hatched part of the anomalous blue spectral sensitivity curve as indicated by F in FIG. 11 is cut through an anomalous blue color vision correcting lens to be able to obtain a new blue spectral sensitivity curve B as shown in FIG. 12. The wavelength where the blue spectral sensitivity curve of the person having the anomalous blue color vision marks its maximum value is corrected to the shorter wavelength side so that the difference from the wavelength where the green spectral sensitivity curve marks its maximum value is enlarged by setting the transmittance around the wavelength (i.e., 530 nm) where the green spectral sensitivity curve marks its maximum value below 50% as shown in a graph of a curve of wavelength vs. transmittance in FIG. 13 and by setting the transmittance around the wavelength (i.e., 440 nm) wherein the blue spectral sensitivity curve marks its maximum value as high as possible. It is noted that in FIG. 12, the wavelength where the new blue spectral sensitivity curve B marks its maximum value is corrected to 440 nm and the difference from the wavelength where the green spectral sensitivity curve marks its maximum value is enlarged to 90 nm. As a result, the color vision of that person was improved considerably as the colors such as green, greenish blue and blue have become apparent.

Figure 5:
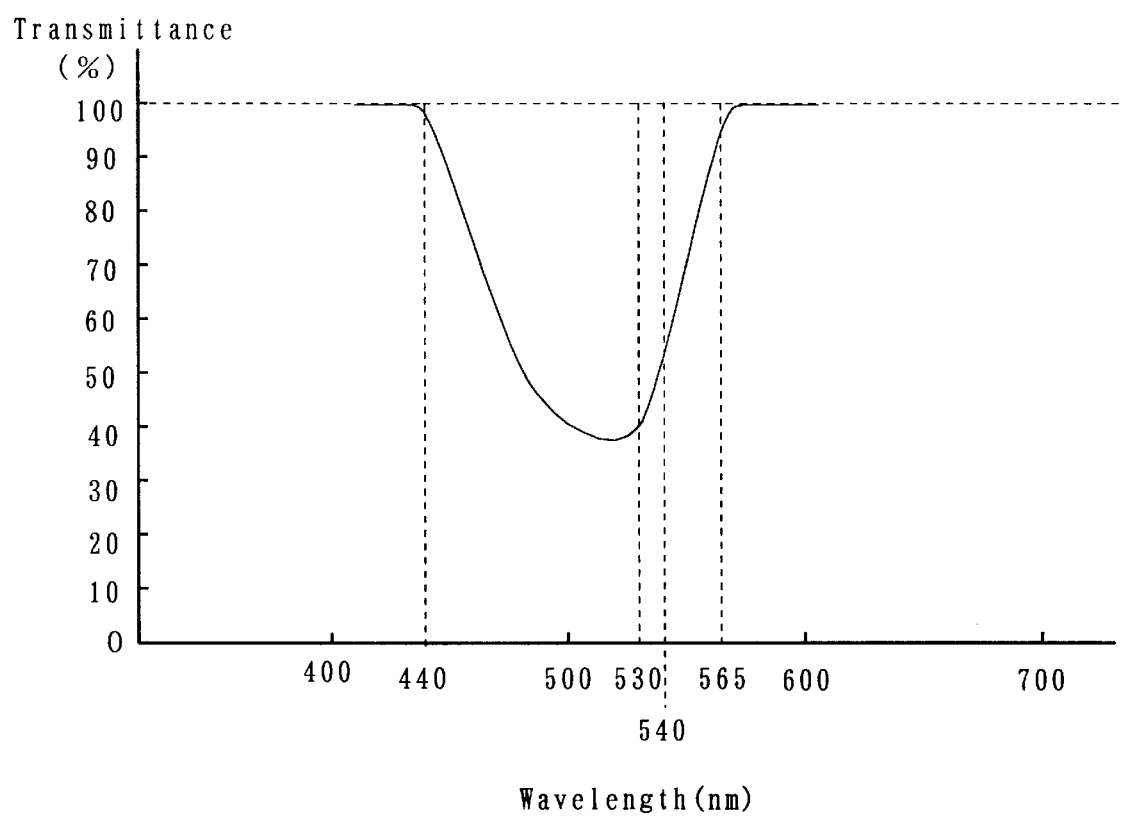
FIG. 5 is a graph showing a curve of wavelength vs. transmittance of an anomalous red color vision-correcting lens of the invention.
Figure 9:
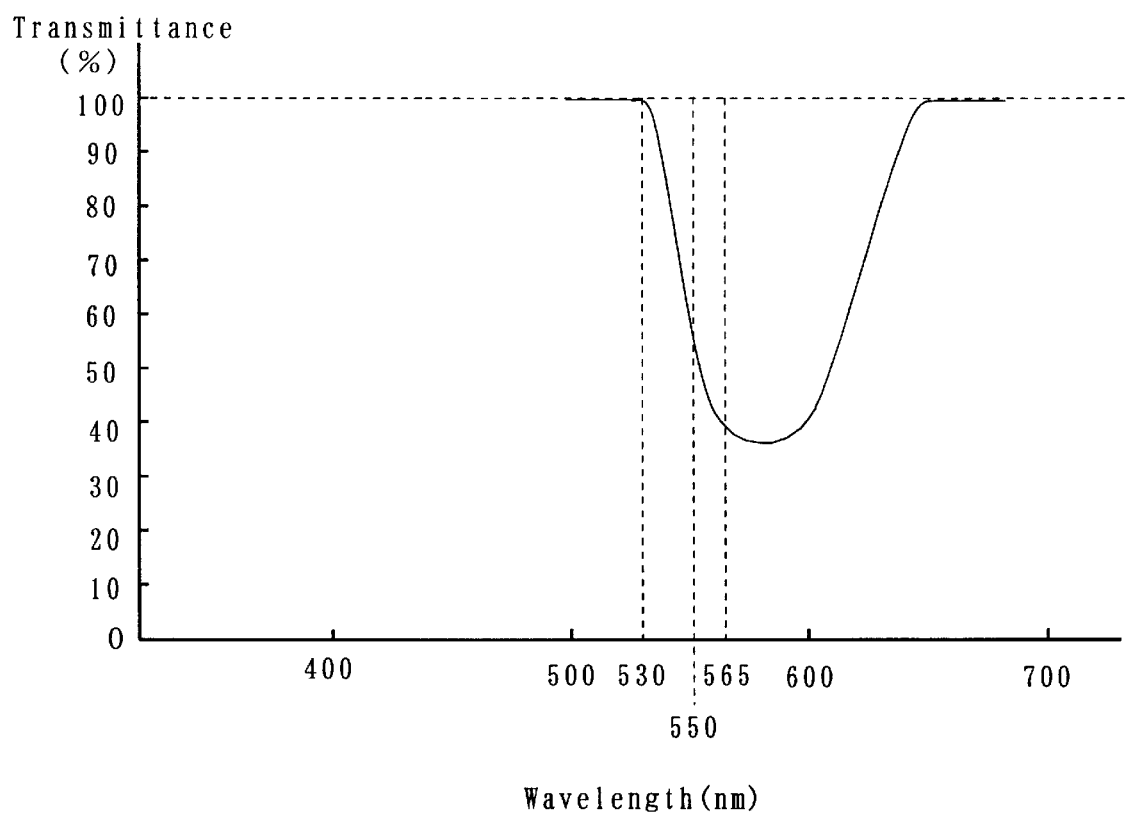
FIG. 9 is a graph showing a curve of wavelength vs. transmittance of an anomalous green color vision-correcting lens of the invention.
Figure 13:
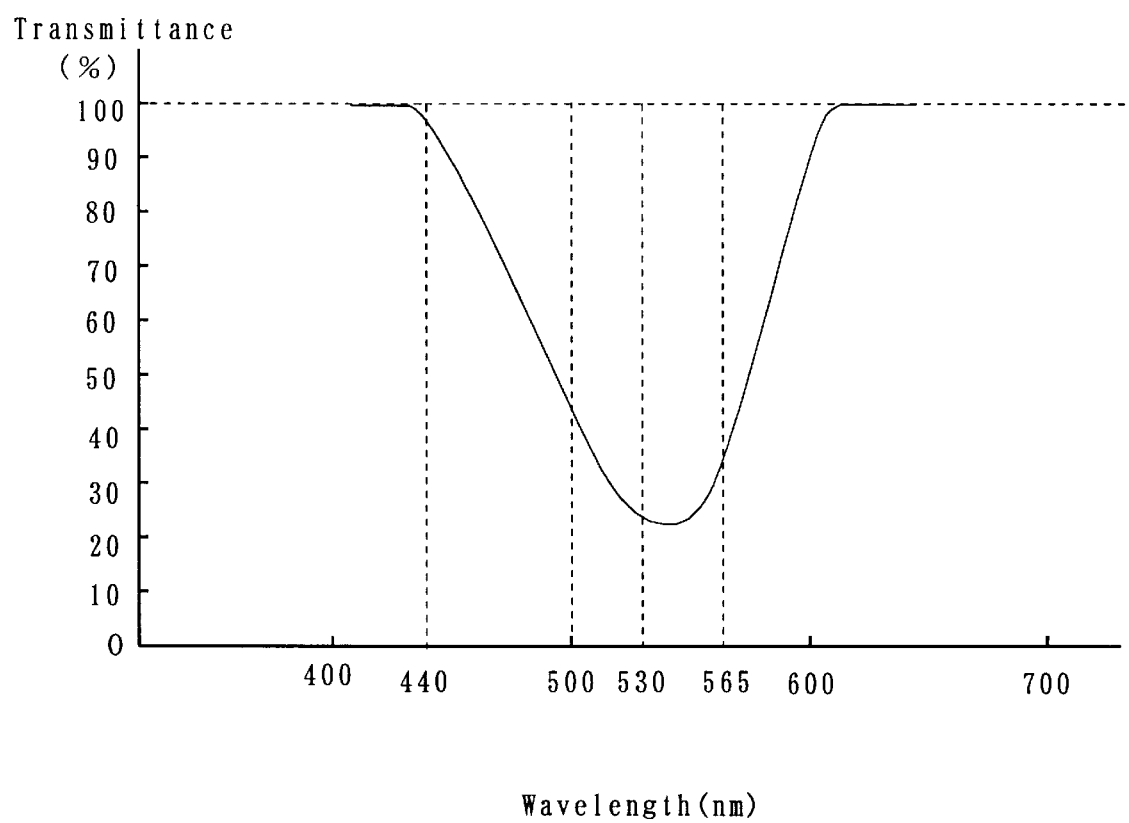
FIG. 13 is a graph showing a curve of wavelength vs. transmittance of an anomalous blue color vision-correcting lens of the invention.

It is noted that the curves representing the characteristics of wavelength vs. transmittance of the lenses shown in FIG. 5, FIG. 9 and FIG. 13 illustrate mere examples and the lenses are manufactured and selected in accordance to each individual person having anomalous color vision. By the way, because it has been known that color sense is not improved fully from the experience of many persons having anomalous color vision when the transmittance around the wavelength where the spectral sensitivity curve of color adjoining to the spectral sensitivity curve of anomalous color is 50% or more, it becomes necessary to set the transmittance below 50%.

It is also possible to use an anomalous color vision testing method as disclosed in Japanese Patent Application No. 10-54352 already invented and applied by the present inventor et. al. in manufacturing and selecting the lens. The lens having the transmitting characteristic as described above may be manufactured by various means such as coloring, coating, half-coating, partial coating and coating of reflecting film. The inventive optical lens for correcting color vision may be utilized not only as glasses but also in the shape of contact lenses, intraocular lenses and magnifying glasses.

As described above, the inventive optical lens for correcting color vision has the useful effects of always and adequately correcting anomalous color vision and of normalizing color vision because it is arranged such that the wavelength where a spectral sensitivity curve of anomalous color among the three primary colors of a person having anomalous color vision marks its maximum value is corrected so as to enlarge the difference from wavelength where a spectral sensitivity curve of color adjoining thereto marks its maximum value by setting the transmittance around the wavelength where the spectral sensitivity curve of the color adjoining to the spectral sensitivity curve of the anomalous color marks its maximum value below 50% and by setting the transmittance around the wavelength where the spectral sensitivity curve of the anomalous color marks its maximum value as high as possible.

While the preferred embodiment has been described, variations thereto will occur to those skilled in the art within the scope of the present inventive concepts that are delineated by the following claims.

What is claimed is:

1. An optical lens for correcting color vision characterized in that wavelength where a spectral sensitivity curve of anomalous color among the three primary colors of a person having anomalous color vision marks its maximum value is corrected so as to enlarge the difference from wavelength where a spectral sensitivity curve of color adjoining thereto marks its maximum value by setting the transmittance around the wavelength where the spectral sensitivity curve of the color adjoining to the spectral sensitivity curve of the anomalous color marks its maximum value below 50% and by setting the transmittance around the wavelength where the spectral sensitivity curve of the anomalous color marks its maximum value as high as possible.

2. An optical lens for correcting color vision characterized in that wavelength where a spectral sensitivity curve of red of a person having anomalous red color vision marks its maximum value is corrected to the longer wavelength side to enlarge the difference from wavelength where a spectral sensitivity curve of green marks its maximum value by setting the transmittance around the wavelength where the spectral sensitivity curve of green marks its maximum value below 50% and by setting the transmittance around the wavelength where the spectral sensitivity curve of red marks its maximum value as high as possible.

3. An optical lens for correcting color vision characterized in that wavelength where a spectral sensitivity curve of green of a person having anomalous green color vision marks its maximum value is corrected to the shorter wavelength side to enlarge the difference from wavelength where a spectral sensitivity curve of red marks its maximum value by setting the transmittance around the wavelength where the spectral sensitivity curve of red marks its maximum value below 50% and by setting the transmittance around the wavelength where the spectral sensitivity curve of green marks its maximum value as high as possible.

4. An optical lens for correcting color vision characterized in that wavelength where a spectral sensitivity curve of blue of a person having anomalous blue color vision marks its maximum value is corrected to the shorter wavelength side to enlarge the difference from wavelength where a spectral sensitivity curve of green marks its maximum value by setting the transmittance around the wavelength where the spectral sensitivity curve of green marks its maximum value below 50% and by setting the transmittance around the wavelength where the spectral sensitivity curve of blue marks its maximum value as high as possible.

* * * * *

Disclaimer and Dedication

6,149,270—Masashi Hayashi, Matsuzaka-shi, Japan. OPTICAL LENSES FOR CORRECTING COLOR VISION. Patent dated November 21, 2000. Disclaimer filed January 30, 2002 by inventor Masashi Hayashi.

Hereby disclaims and dedicates to the Public all claims of said patent
*(Official Gazette, August 13, 2002)*